US005455000A

United States Patent [19]
Seyferth et al.

[11] Patent Number: 5,455,000
[45] Date of Patent: Oct. 3, 1995

[54] METHOD FOR PREPARATION OF A FUNCTIONALLY GRADIENT MATERIAL

[75] Inventors: Dietmar Seyferth, Lexington; Pawel Czubarow, Cambridge, both of Mass.

[73] Assignee: Massachusetts Institute of Technology, Cambridge, Mass.

[21] Appl. No.: 270,131

[22] Filed: Jul. 1, 1994

[51] Int. Cl.$^6$ .................................................. B22F 7/04
[52] U.S. Cl. ................................ 419/36; 419/5; 419/6; 419/8; 419/10; 419/38
[58] Field of Search ........................... 419/5, 6, 8, 10, 419/36, 38

[56] References Cited

U.S. PATENT DOCUMENTS

| | | | |
|---|---|---|---|
| 2,899,338 | 8/1959 | Goetzel et al. | 117/65 |
| 3,149,411 | 9/1964 | Smiley et al. | 29/182.8 |
| 3,547,673 | 12/1970 | Bredzs et al. | 117/22 |
| 4,482,669 | 11/1984 | Seyferth et al. | 524/442 |
| 4,751,099 | 6/1988 | Niino et al. | 427/34 |
| 4,752,535 | 6/1988 | Kvernes | 428/547 |
| 4,778,649 | 10/1988 | Niino et al. | 419/9 |
| 5,167,813 | 12/1992 | Iwata et al. | 210/219 |
| 5,211,999 | 5/1993 | Okada | 428/34.5 |

FOREIGN PATENT DOCUMENTS

| | | |
|---|---|---|
| 0452275A1 | 10/1991 | European Pat. Off. . |
| 2503165 | 6/1976 | Germany . |
| 2-217246 | 8/1990 | Japan . |
| 3-294407 | 12/1991 | Japan . |
| 4-128338 | 4/1992 | Japan . |
| 4-210448 | 7/1992 | Japan . |
| 4-341508 | 11/1992 | Japan . |
| 5-1304 | 1/1993 | Japan . |
| 5-208405 | 8/1993 | Japan . |
| WO92/10442 | 6/1992 | WIPO . |
| WO93/14164 | 7/1993 | WIPO . |

OTHER PUBLICATIONS

Michaeli et al., Advanced Materials, 3, 260–262, (1991).
Takemura et al., Ceramic Transactions Functionally Gradient Materials, 34, 271–278, (1993).
Yoshitake et al., ESA symp. ESA Sp303, 103–107 Jun. 1990.
Shiota et al., Adv. Compos. Mater. II Proc. Jpn, 96–104 (1990).
Koizumi, Ceramic Engineering and Science Proceeding, 16th Annual Conference on Composites and Advanced Ceramic Materials, Part 1, 333–347, (1992).
Bishop et al., Journal of Materials Science, 12, 1516–1518, (1993).
Mizrah et al., powder metallurgy international,—217–220 (1984).
Seyferth et al., J. Am. Ceram. Soc., 75, 1330–1301, (1992).
Seyferth et al., J. Am. Ceram. Soc., 67, C132–C133, (1984).
Seyferth et al., J. Am. Ceram. Soc., 66, C13–C14, (1983).
Wynne et al., Ann. Rev. Mater. Sci., 14, 297–335, (1984).
Seyferth et al., Inorganic and Organometallic Polymers, eds., M. Zeldin et al., American Chemical Society, Washington D.C., 21–41, (1988).
Yajima, Ceramic Bulletin, 62, 893–898, (1983).
Dow Corning Material Safety Data Sheet:Dow Corning X9-6348 Polycarbosilane, 1–7, (1993).

(List continued on next page.)

*Primary Examiner*—Donald P. Walsh
*Assistant Examiner*—John N. Greaves
*Attorney, Agent, or Firm*—Florence Fusco McCann

[57] ABSTRACT

The invention provides a method for in-situ powder metallurgy processing of a functionally gradient material (FGM) which uses a preceramic polymer binder system with the metal and/or ceramic powders used to produce the intermediate layers of the composite. The invention also provides a method for controlling shrinkage of the functionally gradient material during processing while still preserving the desired density of the intermediate layers by controlling the preceramic polymer binder content within the functionally gradient material.

59 Claims, 7 Drawing Sheets

OTHER PUBLICATIONS

Wakashima et al., Proc. ESA Symp. (ESA SP303, Jun. 1990) 97–102, 1990.

Seyferth et al., J. Am. Ceram. Soc., 74, 2687–2689 (1991).

Semen et al., Ceram. Eng. Sci., Proc., 11, 1387–1395, (1990).

Yajima et al., Nature, 36, 237–238, (1976).

METHOD FOR PREPARATION OF A FUNCTIONALLY GRADIENT MATERIAL

The United States Government has rights in this invention based on Contract No. CHE 9221212 from the National Science Foundation.

BACKGROUND OF THE INVENTION

1. Field of the Invention

The invention relates to a method for producing a functionally gradient material and, more particularly, to a method for producing a functionally gradient material using a preceramic polymer binder, as well as to materials so produced.

2. Description of the Prior Art

A Functionally Gradient Material (FGM) is an anisotropic composite material and can be a metal-ceramic material. A gradient in composition and/or microstructure which results in a gradient in composite properties is deliberately introduced into the material. Depending upon the application of the FGM, the gradient can be created in a continuous or stepwise fashion. For example, FGM's are used in aerospace applications where a graded interlayer between a relatively low coefficient of thermal expansion ceramic and a relatively high coefficient of thermal expansion metal relieves thermal stress by comparison with that created when the metal and ceramic are directly bonded. Thus, crack formation is prevented.

Typically, FGM's are prepared by (1) Chemical or Physical Vapor Deposition (CVD/PVD), conventional powder metallurgy processing, plasma spraying or Self Propagating High Temperature Synthesis (SHS). Powder metallurgy processing is the technique most commonly used for the preparation of composites from layers or plies having millimeter dimensions.

Conventional powder metallurgy processing involves consolidation processes that typically require binders which must be removed during some point of the process. These binders include thermoplastic organic binders which are removed by heating of the green composite before sintering of the molded part. Thermolysis of the thermoplastic binder generates volatile byproducts which must be removed from the part. Removal of such volatile byproducts is costly and must be accomplished in a carefully controlled manner if cracking, deformation or bloating of the part is to be avoided. Also, shrinkage control of individual layers is an important issue, especially when top and bottom layers have large differences in density. Conventionally, this is done by blending powders of various particle sizes as described by Takemura et al., "Evaluation of Thermal and Mechanical Properties of Functionally Gradient Materials of $ZrO_2$-Ni System", Ceramic Transactions, 1993, 34, 271.

Preceramic polymers are generally inorganic and organometallic polymers pyrolizable to yield one or more ceramic phases as a residue of the pyrolysis. It has been demonstrated, as described by Semen et al., "A Preceramic Polymer Route to Molded SiC Ceramic Parts", Ceram. Eng. Sci. Proc. 1991, 12, 1967, that preceramic polymers can be used successfully as binders in fabrication of shaped ceramic parts. Little evolution of gaseous byproducts is observed and parts having strengths of over 650 MPa have been fabricated. The use of preceramic polymers as binders for preparation of metal matrix composites has been reported in Yajima et al., "Heat-Resistant Fe-Cr Alloy with Polycarbosilane as Binder", Nature, 1976, 264, 237, in Japanese Patent No. 04-128338 and in Seyferth et al., "Application of Preceramic Polymers in Powder Metallurgy: Their Use as Low-Loss Binders and for in Situ Formation of Dispersed Ceramic Phases in the Metal Matrix", Chem. Mater., 1994, 6, 10.

Thus, there exists a need for a method of in-situ powder metallurgy processing of a functionally gradient material which avoids the use of those types of binders, which, when removed by thermolysis, generate volatile byproducts whose removal is relatively costly and often results in degradation of the properties of the material being formed. This method should also provide a means for controlling shrinkage of functionally gradient material during processing.

SUMMARY OF THE INVENTION

The invention provides a method for producing a functionally gradient material and includes the use of a preceramic polymer binder. Specifically, the method includes steps of providing a substrate; providing a top layer, providing a substrate material powder having the same composition as the substrate; providing a preceramic polymer binder pyrolyzable to yield a ceramic; mixing the substrate material powder with the preceramic polymer binder to form a substrate material powder/preceramic polymer binder mixture characterized by a substrate material/ceramic ratio; forming the intermediate layer by applying the substrate material powder/preceramic polymer binder mixture to the substrate and applying the top layer to form a top layer/intermediate layer/substrate composite body characterized by the substrate material/ceramic ratio and heating the top layer/intermediate layer/substrate composite body so that a functionally gradient material is produced.

According to another aspect of the invention, the steps already described are performed; however, top layer material powder having the same composition as the top layer is mixed with the preceramic polymer binder to form the intermediate layer.

According to yet another aspect of the invention, a method is provided for producing a functionally gradient material which in addition to the above-described steps further includes steps of providing a top layer material powder; mixing the top layer material powder with the substrate material powder and preceramic polymer binder to form a substrate material powder/preceramic polymer binder/top layer material powder mixture characterized by a substrate material/top layer material/ceramic composition and forming an intermediate layer from this mixture.

It is an object of the invention to provide a method for in-situ powder metallurgy FGM processing which uses a preceramic polymer binder system characterized by minimal evolution of gaseous byproducts during pyrolysis and which forms a desirable residue, one or more ceramic phases, as a result of pyrolysis.

It is a further object of the invention to provide a functionally gradient material including ceramic phases finely dispersed in the metal matrix to result in composites having greater hardness, strength and oxidation resistance than a bulk metal.

It is yet another object of the invention to provide a functionally gradient material processing method which controls shrinkage of the functionally gradient material during processing, while still preserving the desired density of these layers.

Other and further objects, features and advantages of the present invention will be readily apparent to those skilled in

BRIEF DESCRIPTION OF THE DRAWINGS

FIG. 10 is a graph showing %volume shrinkage as a function of wt. % Nicalon™ preceramic polymer binder.

DETAILED DESCRIPTION OF THE INVENTION

A functionally gradient material can be prepared by the application of an intermediate layer or stepwise layer-by-layer application of a plurality of intermediate layers which vary stepwise in composition on the substrate and, finally, applying a top layer to the topmost intermediate layer to form the top layer/intermediate layer or layers/substrate composite body which is a green body at this stage of the process. The intermediate layer or layers can include substrate material powder mixed with preceramic polymer binder and can be characterized by a substrate material/ceramic ratio calculated based upon the expected yield of ceramic residue from the preceramic polymer binder upon pyrolysis which, thus, remains fixed through step (8) of heating. The top layer/intermediate layer or layers/substrate composite body is then heated to produce the functionally gradient material.

The foregoing method can be used, for example, to produce a functionally gradient material having a metal substrate, a metal/ceramic intermediate layer and ceramic top layer or to produce a symmetrical functionally gradient material wherein the top layer and substrate are the same material which can be a ceramic or a metal or a mixture of a ceramic and a metal.

A functionally gradient material can also be produced by performing the same steps as described above; however, in step (6) forming an intermediate layer or layers from a mixture of top layer material powder and preceramic polymer binder characterized by a top layer material powder/ceramic ratio calculated based upon the expected yield of ceramic residue from the preceramic polymer binder upon pyrolysis and, thus, remains fixed through step (8) of heating. This method can be used, for example, to produce a functionally gradient material having a ceramic top layer and a ceramic substrate of the same composition as the preceramic polymer binder ceramic residue, but of a different composition than that of the ceramic top layer.

Finally, a functionally gradient material can be produced by performing the already described steps, but in step (6) forming an intermediate layer or layers from a mixture including substrate material powder, preceramic polymer binder and top layer material powder. This method can be used, for example, to fabricate a functionally gradient material wherein the substrate is a metal, the top layer is a ceramic and the preceramic polymer binder is a preceramic polymer binder which has a residue of the same composition as the top layer and top layer material powder. For such a functionally gradient material, varying the relative amounts of top layer material powder and preceramic polymer binder can be one way of controlling shrinkage of the top layer/intermediate layer or layers/substrate green body during heating, as will be described in greater detail elsewhere in this patent application.

Articles produced according to the method of the invention are also provided.

The substrate can be a "bulk material or a solid" which as used herein in the specification and following claims refers to an integral body such as a layer or sheet or other shaped body. The substrate can also be provided in the form of powder which is sintered or otherwise reacts in situ to form a bulk substrate material. The powder can be mixed with a preceramic polymer binder which pyrolyzes to yield a ceramic.

Similarly, the top layer can be provided as a bulk material or a bulk material top layer can be formed in situ from a powder starting material. The powder starting material can be mixed with preceramic polymer binder which pyrolyzes to yield a ceramic and which can, in some cases, serve as a sintering aid for the top layer material powder. When ceramic thin films are desired for the top layer, the preceramic polymer binder may be used alone so that the layer is formed in situ by pyrolysis of the preceramic polymer binder. Usually, the thickness of such layers is on the order of a few nanometers.

A functionally gradient material having a ceramic top layer and a metal substrate or having a ceramic top layer and ceramic substrate of different composition from the ceramic top layer or having a ceramic top layer and ceramic substrate of the same composition or having a metal substrate and metal top layer of the same composition can be prepared according to the method of the invention. The method is broadly applicable to most of the transition metals, main group metals, such as aluminum, f-orbital inner transition metals, metalloids and alloys formed from these elements as well as to most ceramics.

The metal substrate can be a transition metal such as Sc, Ti, V, Cr, Mn, Fe, Co, Ni, Cu, Zn, Y, Zr, Nb, Mo, Tc, Ru, Rh, Pd, Ag, Cd, La, Hf, Ta, W, Re, Os, Ir, Pt, Au, or Hg or mixtures thereof. The metal substrate can also be an f-orbital inner transition metal such as Ce, Pr, Nd, Pm, Sm, Eu, Gd, Tb, Dy, Ho, Er, Tm, Yb, Lu, Th or U or mixtures thereof. Finally, the metal substrate can be a main group metal such as Al, Pb, Sn, Bi or Sb or mixtures thereof. The substrate can also be a metalloid such as B, C, Si or Ge or mixtures thereof. Carbon can be in an amorphous, graphite or diamond form. Most of the foregoing elements and their alloys are readily commercially available in powder form. Alloys can also be formed in situ by combining powders of the elemental constituents of the alloy.

The method is also broadly applicable to preparation of a functionally gradient material including a ceramic layer of almost any ceramic including non-oxide non-metal ceramics, non-oxide metal ceramics, oxide non-metal ceramics and metal oxide ceramics. Non-oxide non-metal ceramics can include materials such as silicon carbide (SiC), silicon nitride ($Si_3N_4$), silicon carbonitride, silicon oxycarbide, silicon oxynitride boron carbide ($B_4C$), boron nitride (BN), silicon boride ($B_4Si$), or aluminum boride (AlB). Non-oxide metal ceramics can include f-orbital inner transition metal carbides, transition metal carbides, such as titanium carbide (TiC) or zirconium carbide (ZrC), or transition metal borides, such as titanium boride ($TiB_2$). Oxide non-metal ceramics can include metalloid oxides like silica ($SiO_2$). Metal oxide ceramics can include materials such as zirconia ($ZrO_2$) and alumina ($Al_2O_3$). The method can also be used with transition metal silicide ceramics and diamond.

Many non-oxide preceramic polymer binders can be used in the method of the invention. The preceramic polymer binder is selected so that it is chemically compatible with the powder with which it is to be combined to form a layer or layers of the functionally gradient material. As used herein, the term "chemical compatibility" indicates that when a particular preceramic polymer binder and powder are used together, the resulting functionally gradient material exhibits a desired microstructure as well as mechanical and physical properties. Preceramic polymer binders which upon pyrolysis yield a ceramic residue which has a residue mass of at least 50% of the starting mass of preceramic polymer binder are suitable for use in the method. Generally, an oxide precursor, i.e., a precursor which produces an oxide upon pyrolysis, can be combined with an oxide powder to yield satisfactory results. A non-oxide precursor, i.e., a precursor which produces a non-oxide upon pyrolysis, can be combined with a non-oxide powder to yield satisfactory results.

Non-oxide preceramic polymer binders include organosilicon polymers that serve as pyrolyric precursors for silicon carbide, silicon nitride or silicon carbonitride, silicon oxycarbide, or silicon oxynitride. The properties, including the type and quantity of pyrolysis products, of these organosilicon polymers vary considerably. For example, pyrolysis in an inert atmosphere can result in formation of differing amounts of free carbon or free silicon in addition to the desired silicon-containing ceramic phase. Some polymers yield an excess of free carbon which can serve as a sintering aid when used with a silicon carbide filler. Other polymers pyrolyze to yield nearly stoichiometric silicon nitride and silicon carbide. The polymer can be selected depending upon the properties desired for a particular application.

The non-oxide preceramic polymer binder can be a polysilane having the chemical formula $(R^1R^2Si)_n$ wherein $R^1$ and $R^2$ are organic substituents such as methyl, vinyl, aryl, phenyl, or allyl groups or hydrogen and having a molecular weight in the range of from about 500 to about 500,000 and more preferably from about 500 to 100,000 relative to polystyrene. The polymer binder may be chemically crosslinked, depending on the identity of the $R^1$ and $R^2$ substituents, with a catalyst such as an early transition metal compound catalyst, a late transition metal compound catalyst, a metalloid compound catalyst, an organic peroxide or azo compound catalyst, or ultraviolet or gamma irradiated. The polymer binder can be a poly(methylsilane) of composition $[(CH_3SiH)_x(CH_3SiH_2)_z(CH_3Si)_y]_n$ where $x+y+z=1$ $x/z=17$, and $0.30<(x+z)<0.95$ as described by Seyferth et al., "Near-Stoichiometric Silicon Carbide from an Economical Polysilane Precursor", J. Am. Ceram. Soc., 1992, 75, 1300. When either the $R^1$ or $R^2$ substituent of the polysilane is hydrogen, use of catalytic amounts of antioxidants such as BHT (2,6-Di-tert-butyl-4-methylphenol) or IRGANOX 245™ (tri-ethylglycol-bis-3-(3-tert-butyl-4-hydroxy-5-methylphenyl) -3-propionate) for oxidation stability, is highly recommended as described by Bryson, "Polysilane-based Compositions, Especially for the Manufacturing of Silicon Carbide, Stabilization of the Compositions, and Manufacturing of Silicon Carbide", PCT International Application WO 93/14164.

The non-oxide preceramic polymer binder can be a polycarbosilane as described by Seyferth, "Polycarbosilanes: An Overview", p. 21 in Inorganic and Organometallic Polymers, ACS Symposium Series 360, Edited by M. Zeldin, K. J. Wynne and H. R. Allcock, American Chemical Society, Washington, DC, 1988. The polycarbosilane can have the chemical formula $[(R^1R^2Si)_a(CH_2)_b]_n$ wherein $R^1$ and $R^2$ are methyl, vinyl, aryl, phenyl, or allyl groups or hydrogen, wherein a is in the range of from about 1 to about 4 and b is in the range of from about 1 to about 4 and having a molecular weight in the range of from about 200 to about 500,000 and more preferably in the range of from about 200 to about 100,000 relative to polystyrene. The structure can be of a more complicated type, e.g., the Nicalon™ polycarbosilane, as described by Yajima, "Special Heat-Resisting Materials from Organometallic Polymers", Am. Ceram. Bull., 1983, 62[8], 893, which has been suggested to contain alternate Si-C bonds arranged in cyclic, linear and crosslinked configurations.

The non-oxide preceramic polymer binder can be a poly(vinylsilane) having the chemical formula $[(CH_2CH) SiH_3]_n$ having a molecular weight in the range of from about 200 to about 500,000, and more preferably in the range of from about 200 to 50,000 relative to polystyrene.

The preceramic polymer binder can also be a polyorganosilazane of the type $[(R^1R^2SiNH)_a(R^1SiN)_b]_n$ wherein $R^1$ and $R^2$ are methyl, vinyl, aryl, phenyl, or allyl groups or hydrogen, as described by Seyferth et al., U.S. Pat. No. 4,482,669. In the foregoing chemical formula, a is in the range of from about 0.3 to about 0.6, b is in the range of from about 0.3 to about 0.7 and having a molecular weight in the range of from about 500 to about 500,000 and more preferably in the range of from about 500 to about 50,000 relative to polystyrene.

The preceramic polymer binder can be an organosiloxane polymer such as $(R^1R^2SiO)_n$ or $[(R^1R^2SiO)_a(R^3SiO_{3/2b})]_n$ wherein $R^1$, $R^2$ and $R^3$ can be a methyl, vinyl, aryl, phenyl or allyl group or hydrogen, a is in the range of from 0 to 0.8, b is in the range of 0.2 to 0.5 and having a molecular weight of in the range of from about 300 to about 500,000 and more preferably in the range of from about 300 to about 50,000 relative to polystyrene.

The preceramic polymer binder can be a boron nitride precursor such as, but not limited to, a decaborane(12)-diamine polymer, a fused ring type polyborazine, a linked ring type polyborazine or a poly(silazanylborazine).

The preceramic polymer binder can also contain other elements such as, but not limited to, titanium, zirconium or aluminum chemically bonded within the polymer structure.

The preceramic polymer binder should be present in the substrate material powder/preceramic polymer binder mixture at levels in the range of from about 2 wt. % to about 60 wt. %, more preferably in the range of from about 2 wt. % to about 40 wt. %, and most preferably in the range of from about 2 wt. % to about 20 wt. % preceramic polymer. A ceramic filler can also be added to the substrate material powder/preceramic polymer binder mixture to produce a desired substrate material/ceramic ratio. As used herein, a "ceramic filler" refers to a powder having the composition of any of the ceramic materials previously set forth.

Steps (5) and (6) of mixing the substrate material powder with the preceramic binder to form a substrate material powder/preceramic polymer binder mixture characterized by a particular substrate material/ceramic ratio and of applying the substrate material powder/preceramic polymer binder to form an intermediate layer having a particular substrate material/ceramic ratio, respectively, can be repeated a plurality of times. In addition, a filler material having the top layer material composition can be incorporated into the mixture to form an intermediate layer or layers having a particular substrate material/top layer material ratio. It is noted that the top layer material powder can be a ceramic filler. With each repetition of steps (5) and (6), a new intermediate layer is applied to the intermediate layer previously formed to produce a top layer/intermediate layer/substrate composite body having a desired composition gradient.

Since each individual layer of the plurality of intermediate layers has a different composition, each of the layers is also characterized by a different individual layer shrinkage rate, heating the top layer/intermediate layers/substrate composite body in step (8) can result in distortion, such as warpage of the top layer/intermediate layers/substrate composite body. Individual layer shrinkage can be controlled and, thus, distortion of the overall top layer/intermediate layers/substrate composite body can be prevented by varying the content of preceramic polymer binder such as by gradually increasing its amount from the amount, if any, present in the substrate layer to the amount present in the top layer. Shrinkage can likewise be controlled by keeping the substrate material/ceramic filler ratio constant in each individual layer and varying the amount of preceramic polymer binder; varying the substrate material powder/preceramic polymer binder ratio while keeping top layer material, which can be ceramic filler, content constant; varying the top layer material or ceramic filler/preceramic polymer binder ratio while keeping the substrate material content constant; or varying all three components, but having a gradual increase of preceramic polymer binder from the amount present in the substrate to that present in the top layer. In these ways, shrinkage can be controlled, while still preserving the desired density of the intermediate layers.

For example, a green top layer/intermediate layer/substrate composite body having a ceramic top layer and a metal substrate, i.e., bottom layer, will develop convex curvature upon pyrolysis as the metal bottom layer undergoes greater shrinkage than the ceramic top layer, if all intermediate layers have constant preceramic polymer binder concentration. However, gradually increasing the amount of binder from none present in the metal substrate layer to the amount present in the top ceramic layer will cause greater shrinkage to occur in the ceramic-rich layers, thereby keeping shrinkage uniform throughout the functionally gradient material and avoiding formation of convex curvature.

Figure 1:
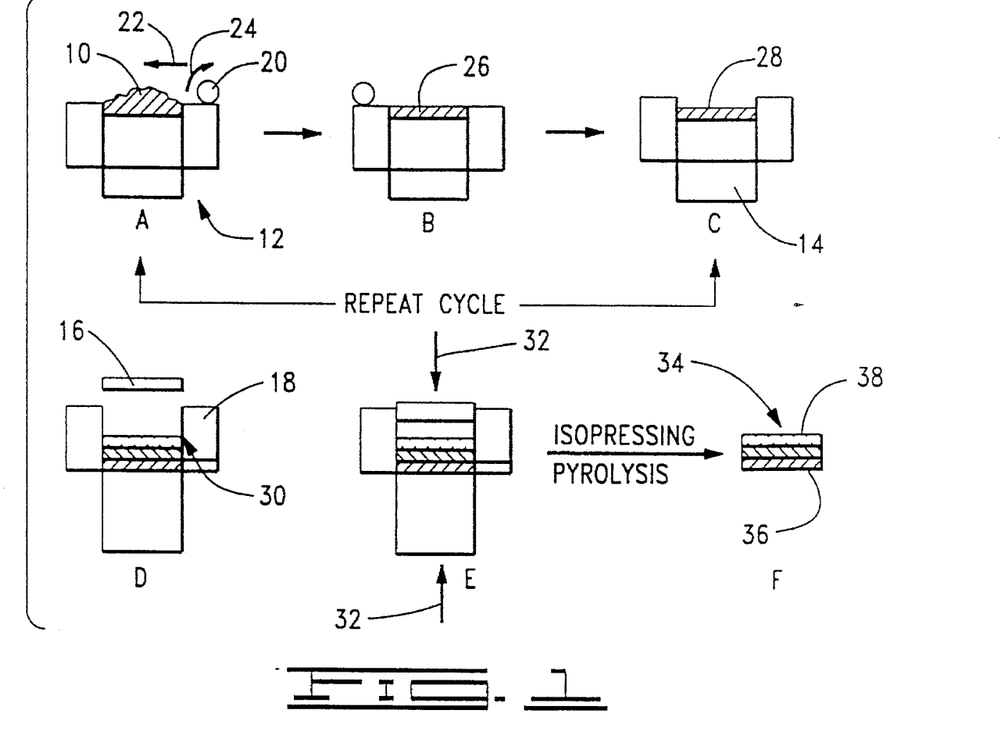
FIG. 1 is a schematic illustration of a process for preparing a functionally gradient material according to the method of the invention.
Figure 2:
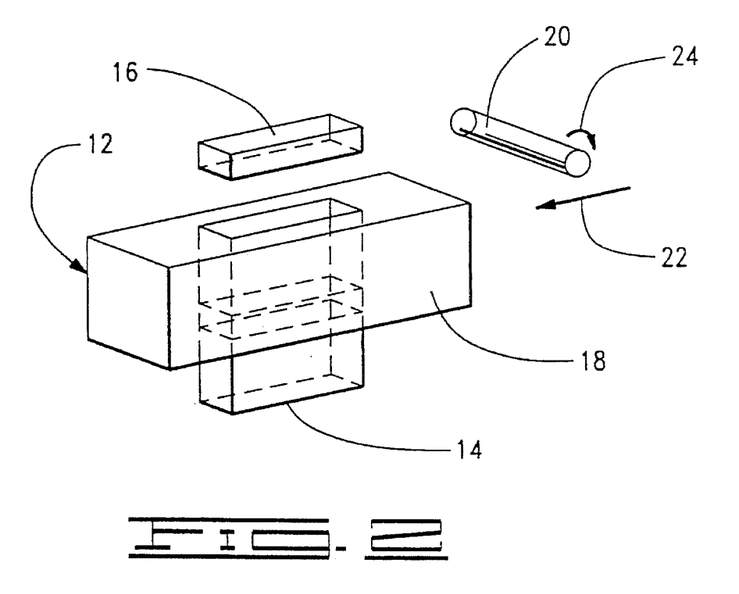
FIG. 2 is a schematic illustration of the die used in the process shown schematically in FIG. 1.

FIG. 1 shows a preferred method for applying the substrate material powder/preceramic polymer binder mixture to a substrate and for applying successive intermediate layers of varying substrate material powder/top layer material powder (ceramic filler)/preceramic polymer binder ratio with a gradient in composition from substrate material-rich to top layer-material rich. In FIG. 1a, substrate powder 10 is loaded into piston assembly 12. As shown in more detail in FIG. 2, piston assembly 12 further includes bottom plunger 14 and top plunger 16 slidably mounted within support member 18 and roller 20. Roller 20 is then translated laterally in the direction given by arrow 22 over powder 10 as roller 20 is itself rotated in the direction given by arrow 24. This counter-rotation and translation of roller 20 results in smooth powder layer 26 shown in FIG. 1b. Although not shown in FIG. 1, a solid bulk material, such as a metal, substrate can be provided to form the first layer. Lower plunger 14 is then retracted downward as shown in FIG 1c, so that an additional powder layer richer in top layer material can be applied to surface 28 of smooth powder layer 26 which is poorer in top layer material content than is the new layer being applied thereto. When an assembly of intermediate layers 30 has been built up on bottom plunger 14, top plunger 16 is brought into contact with support member 18 as shown in FIG. 1d and uniaxial pressure is applied in the directions given by arrows 32 in FIG. 1e. A strong, coherent functionally gradient material 34, having metal rich surface 36 and ceramic rich surface 38 is produced once additional steps of isopressing and pyrolysis are completed.

Step (8) of heating can include a first pyrolysis at a first pyrolysis temperature to pyrolyze the preceramic polymer binder to obtain a ceramic product which is followed by heating the ceramic product to a reaction temperature higher than the pyrolysis temperature at which the solid-state reaction of the ceramic product with the substrate material powder occurs.

In a preferred embodiment of the invention, the functionally gradient material is a copper/silicon carbide functionally gradient material, the substrate is copper powder, the substrate material powder is copper powder and the preceramic polymer binder is polycarbosilane.

In another preferred embodiment of the invention, the functionally gradient material is a copper/silicon carbide functionally gradient material, the substrate is bulk copper metal, the substrate material powder is copper powder and the preceramic polymer binder is polycarbosilane.

In yet another preferred embodiment of the invention, the functionally gradient material is an aluminum/silicon carbide functionally gradient material, the substrate is aluminum powder combined with preceramic polymer binder, the substrate material powder is aluminum powder and the preceramic polymer binder is poly(methylsilane).

In order to further illustrate the method of the present invention and the characteristics of articles produced according to that method, the following examples are provided. The particular compounds and processing conditions utilized in the examples are meant to be illustrative of the present invention and not limiting thereto.

EXAMPLE 1

The following example is provided to show how a Cu/SiC functionally gradient material can be prepared using a powder substrate.

Powder mixes were prepared having the compositions given in Table 1 which follows.

TABLE 1

| SiC (<1 micron particle size) mole % based on Si | Nicalon ™ Precursor mole % based on Si | Cu Powder (−325 mesh) mole % | Mix No. |
| --- | --- | --- | --- |
| 90 | 10 | 0 | 1 |
| 50 | 10 | 40 | 2 |
| 20 | 10 | 70 | 3 |

TABLE 1-continued

| SiC (<1 micron particle size) mole % based on Si | Nicalon ™ Precursor mole % based on Si | Cu Powder (−325 mesh) mole % | Mix No. |
|---|---|---|---|
| 10 | 10 | 80 | 4 |
| 0 | 10 | 90 | 5 |
| 0 | 5 | 95 | 6 |
| 0 | 0 | 100 | 7 |

Dry mixtures of powders having Mix Nos. 1–7 were each suspended in toluene with sonic activation using a Branson 3200 apparatus operating between 45 KHz and 56 KHz to maintain dispersion of the particles and to maintain cleanliness of the surfaces of the metal particles. After overnight sonic activation, the solvent was removed in vacuum and the powders were dried, pulverized in a mortar and pestle and passed through a 270 mesh sieve to assure a uniform particle size distribution. Nicalon™ X9-6348 precursor is the precursor to Nicalon198 fibers and is a commercially available polycarbosilane distributed by Dow Corning Co. and manufactured by Nippon Carbon Co. Ltd., Japan, characterized by a molecular weight relative to polystyrene of in the range of from about 1,000 to about 275,000 and from about 1,000 to about 400,000 when cross-linked. The powders were then compacted and uniaxially compressed at 13.5 kpsi for 1 hour and isostatically pressed at 40 kpsi for 10 minutes to form a green functionally gradient body according to the steps shown in FIG. 1. The green functionally gradient material body was then pyrolyzed in a furnace under an Ar atmosphere according to the following firing schedule: ramp I: 5°/min.; dwell I: 2 hours, 250° C.; ramp II: 5°/min.; dwell II: 3 hour, 900° C. with the green functionally gradient material body kept under a 200 g uniaxial load.

Figure 3:
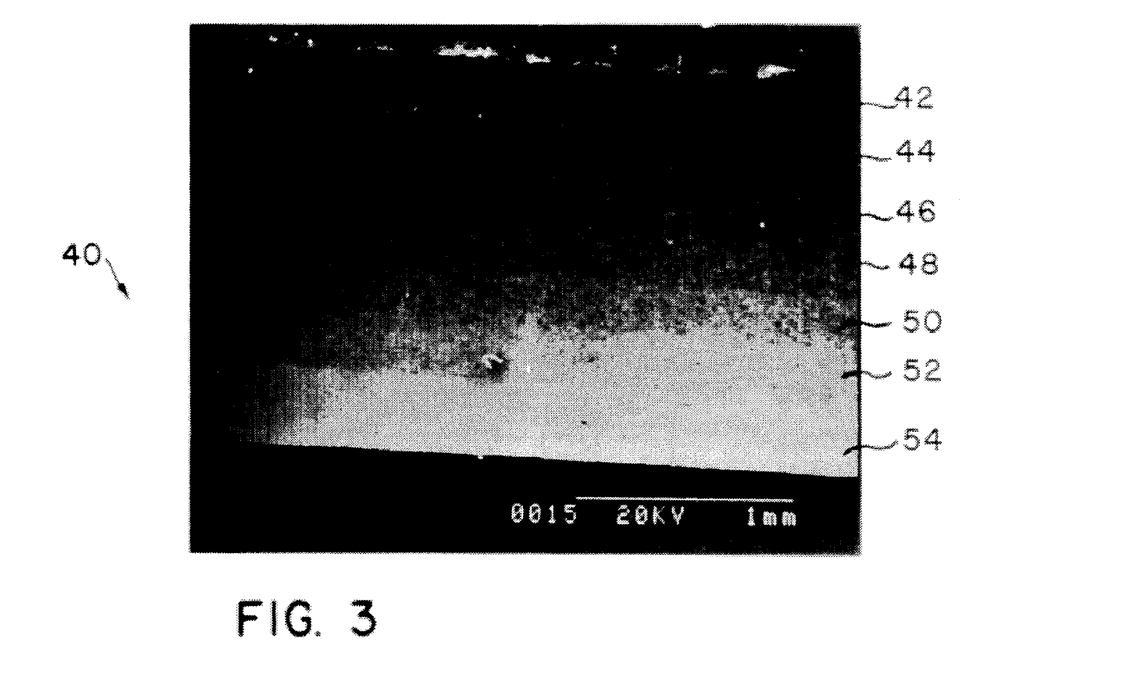
FIG. 3 is a scanning electron microscope (SEM) image showing a cross-section of a Cu/SiC FGM prepared using a powder substrate.

FIG. 3 shows Cu/SiC functionally gradient material 40 produced according to the foregoing example. In the photomicrograph, layers 42, 44, 46, 48, 50, 52 and 54, respectively, have compositions corresponding to Mix Nos. 1, 2, 3, 4, 5, 6 and 7.

EXAMPLE 2

The following example is provided to show how a Cu/SiC functionally gradient material can be prepared using a solid, bulk copper metal substrate.

Powder mixes were prepared having the compositions given in Table 2 which follows.

TABLE 2

| SiC (−600 mesh) mole % based on Si | Nicalon ™ Precursor mole % based on Si | Cu Powder (−325 mesh) mole % | Mix No. |
|---|---|---|---|
| 90 (with 3 wt. % B for sintering) | 10 | 0 | 1 |
| 0 | 10 | 90 | 2 |
| 0 | 5 | 95 | 3 |

The mixes were prepared using the same procedure as already described in Example 1. The powders were then applied in the sequence first Mix No. 2 followed by Mix No. 1 on a solid Oxygen Free Copper (OFC) grade solid, bulk copper plate having dimensions 1.25×3.78×0.15 cm. The surface of the copper plate was previously oxidized by extensive polishing on 4000 grit SiC paper in air using a water coolant. The compaction, pressing and firling procedures used were the same as those already described in Example 1.

Figure 4:
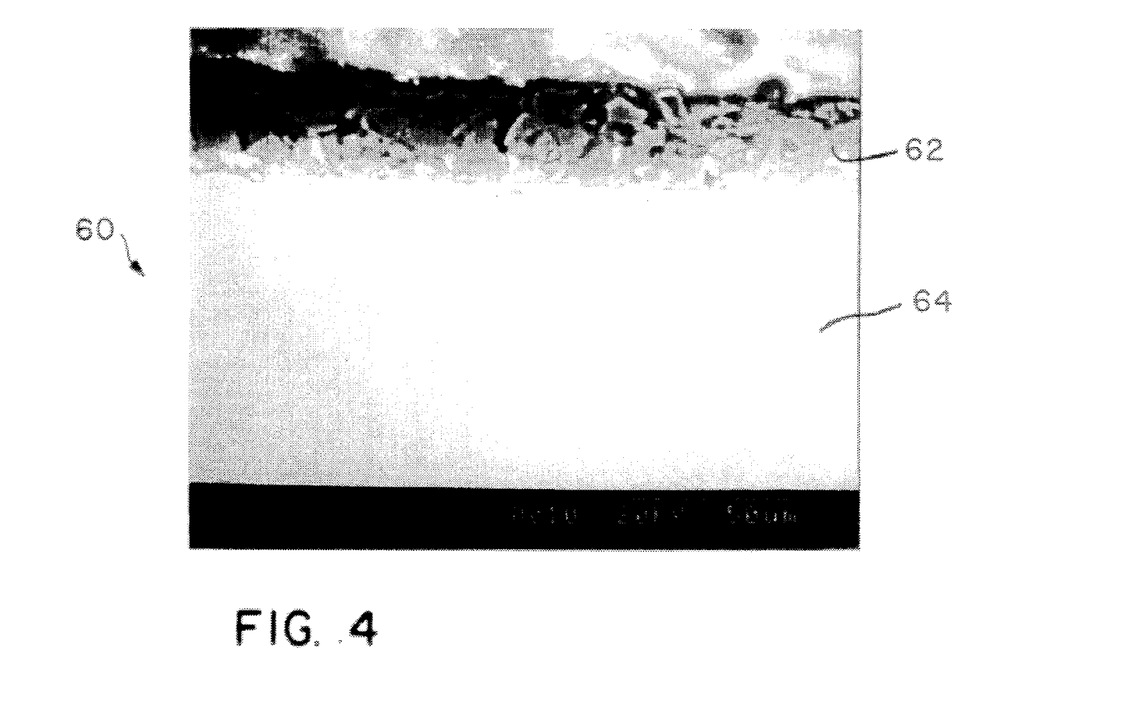
FIG. 4 is a scanning electron microscope (SEM) image showing a cross-section of a Cu/SiC FGM prepared using a bulk substrate.

FIG. 4 shows Cu/SiC functionally gradient material 60 produced according to the foregoing example. In the photomicrograph, layer 62 has the same composition as Mix No. 1 except for containing only 2 wt. % B and layer 64 is solid copper.

Figure 5:
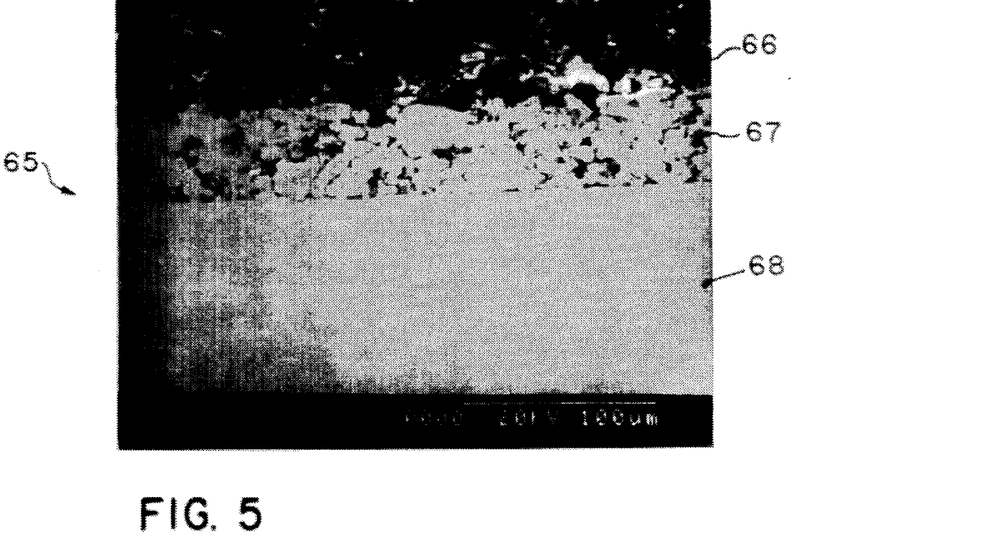
FIG. 5 is a scanning electron microscope (SEM) image showing a cross-section of a Cu/SiC FGM prepared using a bulk substrate.

FIG. 5 shows Cu/SiC functionally gradient material 65 produced according to the foregoing example. In the photomicrograph, layer 66 has the same composition as Mix No. 1, layer 67 has the same composition as Mix No. 2 and layer 68 is solid copper.

EXAMPLE 3

The following example is provided to show how an Al/SiC functionally gradient material can be prepared using an aluminum powder substrate.

Powder mixes were prepared having the compositions given in Table 3 which follows.

TABLE 3

| SiC (<1 micron particle size) mole % based on Si | Poly(methylsilane) mole % based on Si | Al Powder (−325 mesh) mole % | Mix No. |
|---|---|---|---|
| 90 | 10 (Nicalon ™ precursor) | 0 | 1 |
| 50 | 10 | 40 | 2 |
| 20 | 10 | 70 | 3 |
| 10 | 10 | 80 | 4 |
| 0 | 10 | 90 | 5 |
| 0 | 0 | 100 | 6 |

Powder mixing, compaction and compressing into the green functionally gradient material body were performed using the procedures already described in Example 1. The poly(methylsilane) was prepared as described in Seyferth et al., "Near-Stoichiometric Silicon Carbide from an Economical Polysilane Precursor", J. Am. Ceram. Soc. 1992, 75, 1300 which is incorporated herein by reference. Pyrolysis was conducted using the following firing program: ramp I: 5°/min.; dwell I: 2 hours, 250° C.; ramp II: 5°/min.; dwell II: 3 hours, 550° C. with final pyrolysis at 1000° C.

Figure 6:
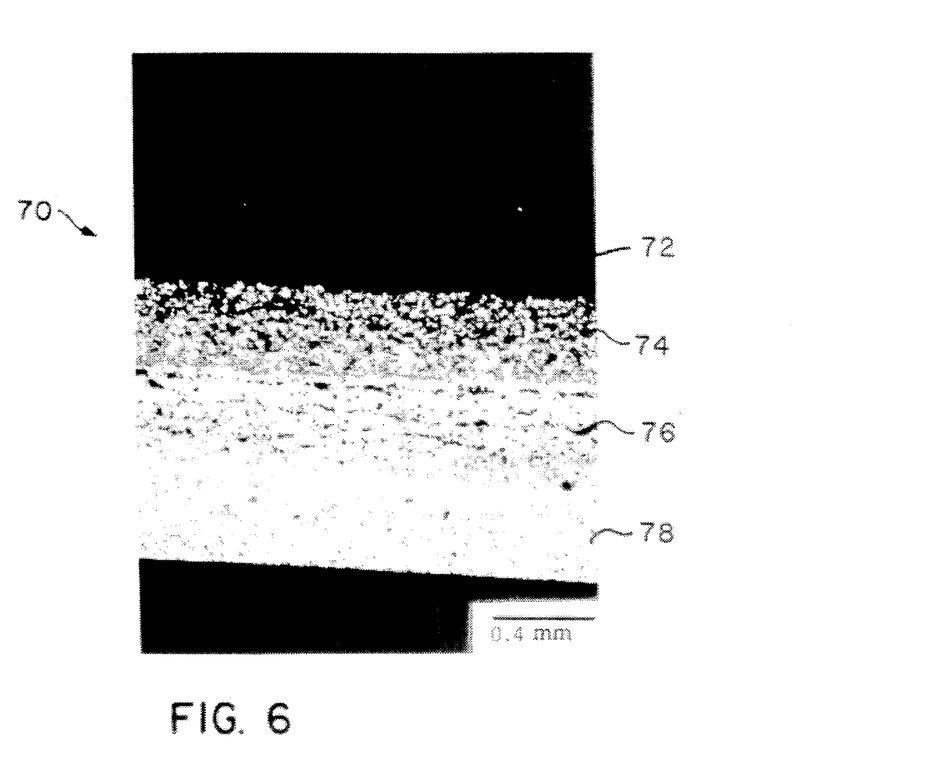
FIG. 6 is an optical microscope image showing a cross-section of an Al/SiC FGM pyrolyzed at 550° C.

FIG. 6 shows Al/SiC functionally gradient material 70 produced according to the foregoing example and pyrolyzed to 550° C. In the photomicrograph, layers 72, 74, 76, and 78 correspond, respectively, to Mix Nos. 1, 2, 4, and 5, respectively.

Figure 7:
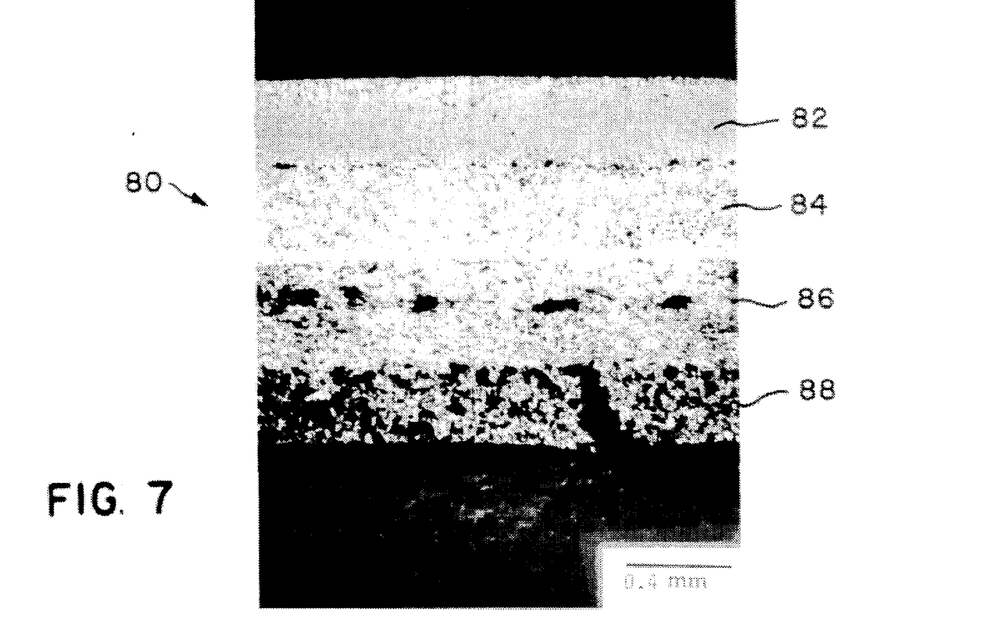
FIG. 7 is an optical microscope image of a cross-section of an Al/SiC FGM pyrolyzed at 1000° C.

FIG. 7 shows Al/SiC functionally gradient material 80 produced according to the foregoing example and pyrolyzed to 1000° C. In the photomicrograph, layers 82, 84, 86, and 88 correspond, respectively, to Mix Nos. 1, 2, 4, and 5, respectively.

Figure 8:
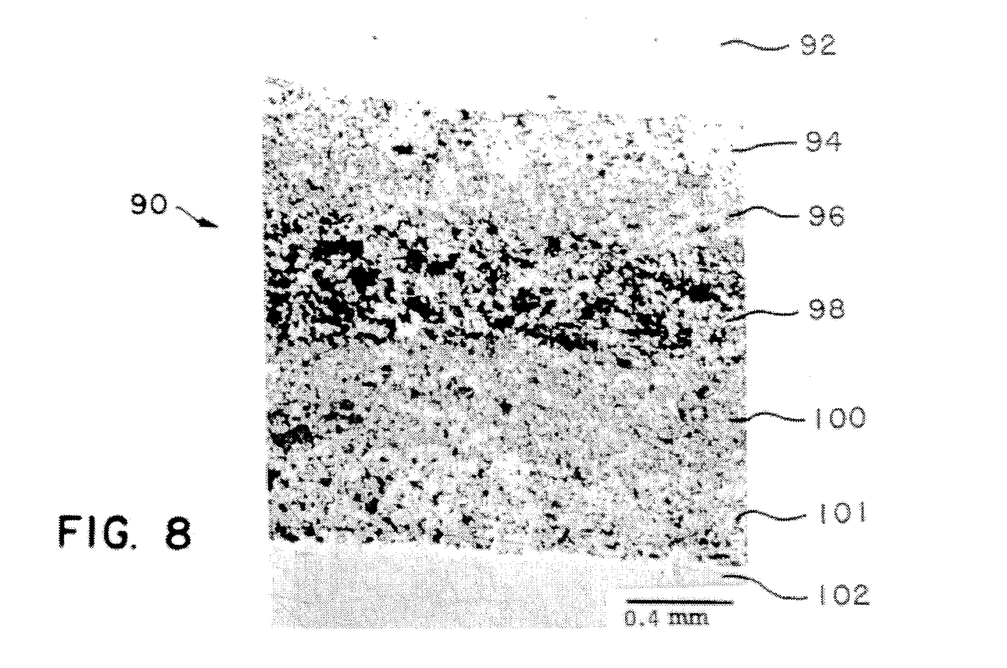
FIG. 8 is an optical microscope image of an Al/SiC FGM.

FIG. 8 shows a cross-section of an Al/SiC "sandwich" functionally gradient material 90 produced according to the foregoing example and pyrolyzed to 550° C. In the photomicrograph, layers 92, 94, 96, 98, 100, 101 and 102 correspond, respectively, to Mix Nos. 6, 5, 4, 3, 4, 5 and 6.

Figure 9:
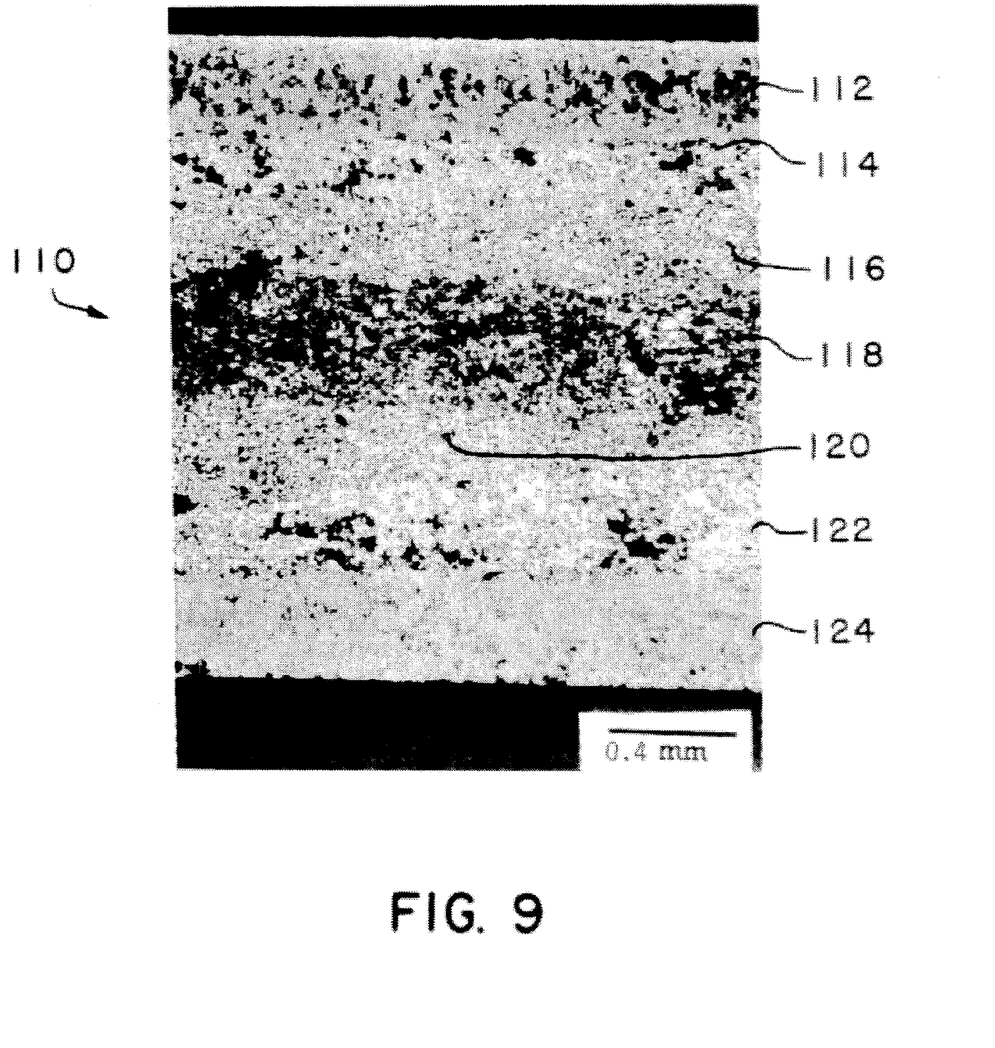
FIG. 9 is an optical microscope image of an Al/SiC FGM.

FIG. 9 shows a cross-section of an Al/SiC "sandwich" functionally gradient material 110 produced according to the foregoing example and pyrolyzed to 1000° C. In the photomicrograph, layers 112, 114, 116, 118, 120, 122 and 124 correspond, respectively, to Mix Nos. 1, 2, 4, 5, 4, 2 and 1.

EXAMPLE 4

The following example is provided to show how shrinkage of a green functionally gradient material can be controlled during firing by controlling the amount of preceramic polymer binder mixed with powder to form the intermediate layers.

Blends of SiC of less than one micron particle size and cross-linked Nicalon™ precursor having varying Nicalon™ precursor contents were compacted uniaxially at 90 kpsi for one hour and isostatically pressed at 40 kpsi for 10 minutes. The resulting green bodies of varying Nicalon™ precursor contents were pyrolyzed in Ar for 3 hours at 1500° C. FIG. 10 is a plot of % volume shrinkage measured by volume displacement of isopropyl alcohol observed as a function of Nicalon™ precursor content and indicates that higher Nicalon™ precursor contents result in greater shrinkage. Shrinkage control was demonstrated by using varying ratios of precross-linked Nicalon™ polycarbosilane/silicon carbide and substrate material/toplayer material ratio; along with identical pressing and heating conditions for each sample. Linear behavior of % volume shrinkage rs. wt. % of the preceramic polymer binder was observed as shown in FIG. 10. For all Nicalon™ precursor contents, minimal density change compared with volume shrinkage was observed. The average density of the final ceramic was 2.58 g/cc.

The cross-linked Nicalon™ was prepared by refluxing the as-received polymer in hexane with 0.5 mole % of $Co_2(CO)_8$ catalyst compound for 16 hours.

| Nicalon ™ Precursor mole % based on Si | SiC (<1 micron particle size) mole % based on Si | Cu powder (−325 mesh) mole % | Mix No. |
|---|---|---|---|
| 31 | 69 | 0 | 1 |
| 24 | 62 | 14 | 2 |
| 19 | 52 | 29 | 3 |
| 14 | 36 | 50 | 4 |
| 8 | 20 | 72 | 5 |
| 0 | 0 | 100 | 6 |

Figure 11:
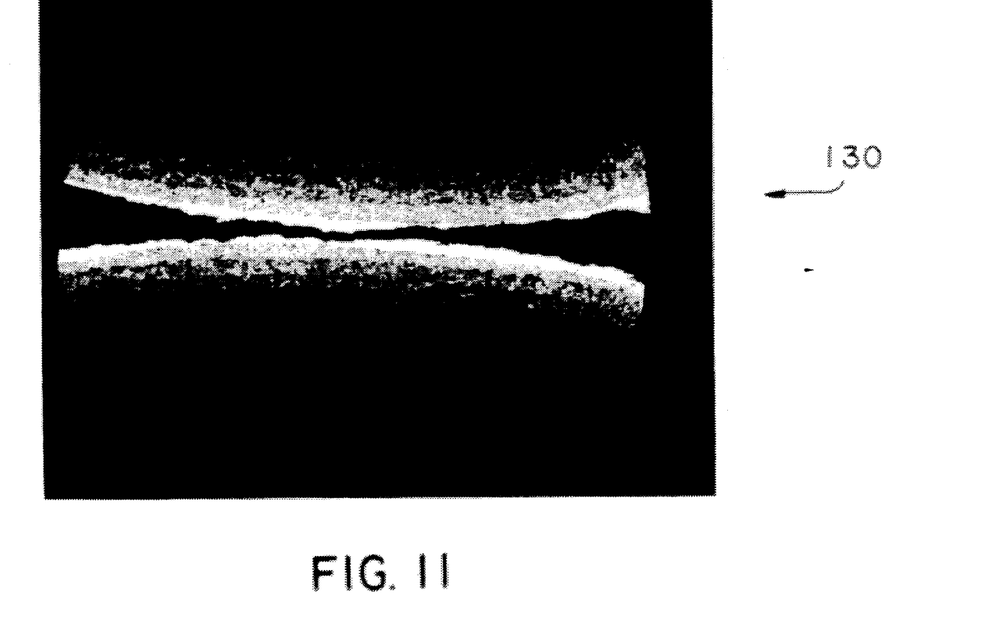
FIG. 11 is an optical microscope image of a Cu/SiC FGM.

FIG. 11 is an optical micrograph at 14×magnification and shows a cross-section of Cu/SiC "sandwich" functionally gradient material 130 produced according to the foregoing example and pyrolyzed to 900° C. The Cu/SiC "sandwich" is made up of layers corresponding to the following Mix Nos. of Table 4: 1, 2, 3, 4, 5, 6, 5, 4, 3, 2 and 1.

Figure 12:
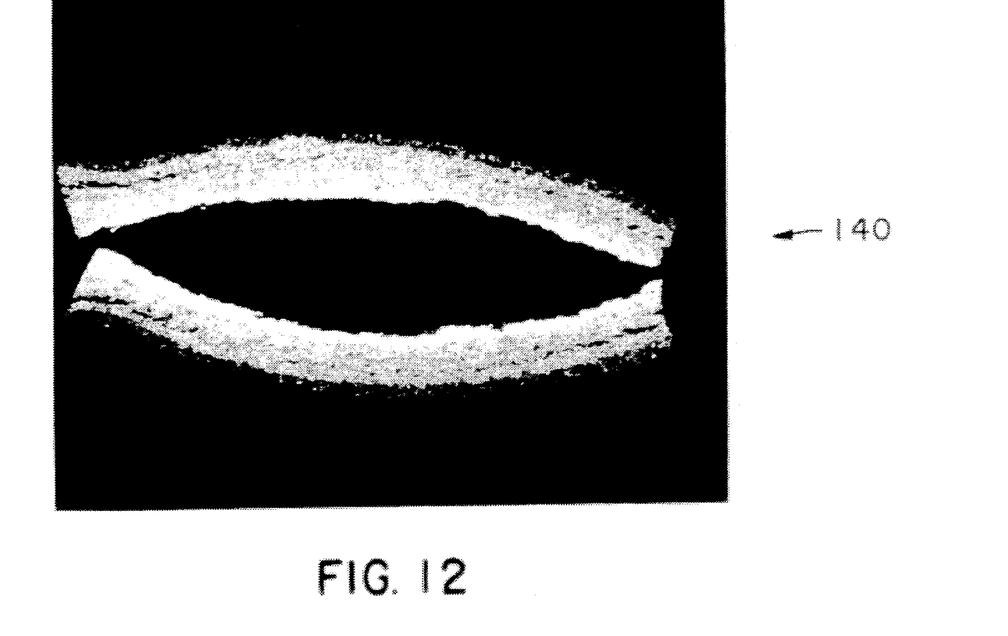
FIG. 12 is an optical microscope image of a Cu/SiC FGM.

FIG. 12 is an optical micrograph at 14×magnification and shows a cross-section of a Cu/SiC "sandwich" functionally gradient material 140 produced according to the foregoing example and pyrolyzed to 900° C. The sandwich includes layers corresponding to the following Mix Nos. as given in Table 1 from Example 1: 1, 2, 3, 4, 5, 7, 5, 4, 3, 2 and 1.

What is claimed is:

1. A method for preparation of a functionally gradient material comprising:
   (1) providing a substrate;
   (2) providing a top layer;
   (3) providing a substrate material powder having the same composition as said substrate;
   (4) providing a preceramic polymer binder which can be pyrolyzed to yield a ceramic;
   (5) mixing said substrate material powder with said preceramic polymer binder to form a substrate material powder/preceramic polymer binder mixture characterized by a substrate material/ceramic ratio;
   (6) forming an intermediate layer characterized by said substrate material/ceramic ratio by applying said substrate material powder/preceramic polymer binder mixture to said substrate;
   (7) applying said top layer to said intermediate layer to form a top layer/intermediate layer/substrate composite body; and
   (8) heating said top layer/intermediate layer/ substrate composite body so that a functionally gradient material including an intermediate layer having said substrate material/ceramic ratio is produced.

2. The method of claim 1 wherein said substrate is a bulk material.

3. The method of claim 1 wherein said substrate is a powder and a bulk substrate material is formed in situ.

4. The method of claim 1 wherein said top layer is a bulk material.

5. The method of claim 1 wherein said top layer is a powder and a bulk material top layer is formed in situ.

6. The method of claim 1 wherein said substrate is a metal substrate and said top layer is a ceramic top layer.

7. The method of claim 1 wherein said top layer is further characterized by a top layer composition and said substrate is further characterized by a substrate composition and wherein said top layer composition and said substrate composition are the same so that said top layer/intermediate layer/substrate composite body is a symmetrical composite body.

8. The method of claim 6 wherein said metal substrate is a metal selected from the group consisting of Sc, Ti, V, Cr, Mn, Fe, Co, Ni, Cu, Zn, Y, Zr, Nb, Mo, Tc, Ru, Rh, Pd, Ag, Cd, La, Hf, Ta, W, Re, Os, Ir, Pt, Au, Hg and mixtures thereof.

9. The method of claim 6 wherein said metal substrate is a metal selected from the group consisting of Ce, Pr, Nd, Pm, Sm, Eu, Gd, Tb, Dy, Ho, Er, Tm, Yb, Lu, Th and U and mixtures thereof.

10. The method of claim 6 wherein said metal substrate is a metal selected from the group consisting of Al, Pb, Sn, Sb and Bi and mixtures thereof.

11. The method of claim 1 wherein said substrate is a metalloid substrate and said top layer is a ceramic top layer.

12. The method of claim 11 wherein said metalloid substrate is selected from the group consisting of B, amorphous carbon, graphitic carbon, diamond, Si and Ge and mixtures thereof.

13. The method of claim 1 wherein said substrate is an alloy substrate and said alloy includes at least two elements selected from the group consisting of metals and metalloids and mixtures thereof.

14. The method of claim 6 wherein said ceramic top layer is a ceramic selected from the group consisting of silicon carbide, silicon nitride, silicon oxycarbide, silicon oxynitride, boron nitride, boron carbide, aluminum nitride, transition metal nitrides, transition metal carbides, f-orbital inner transition metal carbides, boron carbide, transition metal silicides, transition metal borides, transition metal phosphides, metal oxides, metalloid oxides and diamond and mixtures thereof.

15. The method of claim 11 wherein said ceramic top layer is a ceramic selected from the group consisting of silicon carbide, silicon nitride, silicon oxycarbide, silicon oxynitride, boron nitride, boron carbide, aluminum nitride, transition metal nitrides, transition metal carbides, f-orbital inner transition metal carbides, boron carbide, transition metal silicides, transition metal borides, transition metal phosphides, metal oxides, metalloid oxides and diamond and mixtures thereof.

16. The method of claim 1 wherein said substrate is a first ceramic and said top layer is a second ceramic different in composition from said first ceramic.

17. The method of claim 6 wherein said substrate material powder is an alloy metal powder.

18. The method of claim 6 wherein step (3) of providing a substrate material powder further comprises providing elemental constituent powders of the elemental constituents of an alloy and mixing said elemental constituent powders so that said alloy is formed in situ.

19. The method of claim 1 wherein step (4) of providing a preceramic polymer binder further includes selecting a preceramic polymer binder which is chemically compatible with said substrate material powder.

20. The method of claim 19 wherein said preceramic polymer binder is an oxide precursor and said substrate material powder is an oxide ceramic powder.

21. The method of claim 19 wherein said preceramic polymer binder is a non-oxide precursor and said substrate material powder is a non-oxide powder.

22. The method of claim 1 wherein said preceramic polymer binder is further characterized by a preceramic polymer pyrolysis yield of ceramic residue and by a preceramic polymer starting mass and said preceramic polymer pyrolysis yield is at least 50% of said preceramic polymer starting mass.

23. The method of claim 1 wherein said preceramic polymer binder is a non-oxide preceramic polymer.

24. The method of claim 23 wherein said non-oxide preceramic polymer binder is a poiysilane, having the chemical formula $(R^1R^2Si)_n$ wherein $R^1$ and $R^2$ are selected from the group consisting of methyl, vinyl, aryl, phenyl, allyl and hydrogen and having a molecular weight in the range of from about 500 to about 500,000 relative to polystyrene and more preferably in the range of from about 500 to about 100,000 relative to polystyrene.

25. The method of claim 23 wherein said non-oxide preceramic polymer binder is a poly(methylsilane) of composition $[(CH_3SiH)_x(CH_3SiH_2)_z(CH_3Si)_y]_n$ where $x+y+z=1$, $x/z=17$, and $0.30<(x+z)<0.95$.

26. The method of claim 23 wherein said non-oxide preceramic polymer binder is a polycarbosilane having the chemical formula $[(R^1R^2Si)_a(CH_2)_b]_n$ wherein $R^1$ and $R^2$ are selected from the group consisting of methyl, vinyl, aryl, phenyl, allyl and hydrogen, wherein a is in the range of from about 1 to about 4 and b is in the range of from about 1 to about 4 and having a molecular weight in the range of from about 200 to about 500,000 relative to polystyrene and more preferably in the range of from about 200 to about 100,000 relative to polystyrene.

27. The method of claim 23 wherein said non-oxide preceramic polymer binder is a poly(vinylsilane) having the chemical formula $[(CH_2CH) SiH_3]_n$ and having a molecular weight in the range of from about 200 to about 500,000 relative to polystyrene and more preferably in the range of from about 200 to 50,000 relative to polystyrene.

28. The method of claim 23 wherein said preceramic polymer binder is a polyorganosilazane of the type $[(R^1R^2SiNH)_a(R^1SiN)_b]_n$ wherein $R^1$ and $R^2$ are selected from the group consisting of methyl, vinyl, aryl, phenyl, allyl and hydrogen, a is in the range of from about 0.3 to about 0.6, b is in the range of from about 0.3 to about 0.7 and having a molecular weight in the range of from about 500 to about 500,000 relative to polystyrene and more preferably in the range of from about 500 to about 50,000 relative to polystyrene.

29. The method of claim 23 wherein said preceramic polymer binder is a boron nitride precursor selected from the group consisting of a decaborane(12)-diamine polymer, a fused ring type polyborazine, a linked ring type polyborazine and a poly(silazanylborazine).

30. The method of claim 1 wherein said preceramic polymer binder is an organosiloxane polymer selected from the group consisting of $(R^1R^2SiO)_n$ and $[(R^1R^2SiO)_a(R^3SiO_{3/2b})]_n$ wherein $R^1$, $R^2$ and $R^3$ are selected from the group consisting of methyl, vinyl, aryl, phenyl, allyl and hydrogen, a is in the range of from about 0 to about 0.8, b is in the range of from about 0.2 to about 0.5 and having a molecular weight of in the range of from about 300 to about 500,000 relative to polystyrene and more preferably in the range of from about 300 to about 50,000 relative to polystyrene.

31. The method of claim 1 wherein said substrate material powder/preceramic polymer binder mixture includes in the range of from about 2 wt. % to about 60 wt. % preceramic polymer, more preferably in the range of from about 2 wt. % to about 40 wt. % preceramic polymer and most preferably in the range of from about 2 wt. % to about 20 wt. % preceramic polymer.

32. The method of claim 31 further comprising a step of adding a ceramic filler to said substrate material powder/ preceramic polymer binder mixture to yield a desired substrate material/ceramic ratio.

33. The method of claim 1 wherein steps (5) and (6) are repeated to produce a plurality of intermediate layers so that each individual layer of said plurality of layers is characterized by a different individual layer substrate material powder/ceramic ratio to produce a top layer/intermediate layers/substrate composite body.

34. The method of claim 33 wherein each of said individual layers is further characterized by an individual layer shrinkage and further comprising a step of controlling shrinkage in said layers during step (8) of heating said top layer/intermediate layers/substrate composite body by selecting the content of preceramic polymer binder in each of said individual layers to control shrinkage of said top layer/intermediate layers/substrate composite body.

35. The method of claim 33 wherein each of said individual layers is further characterized by an individual layer shrinkage and further includes a ceramic filler, and further comprising a step of controlling shrinkage in said layers during step (8) of heating said top layer/intermediate layers/ substrate composite body by keeping a constant substrate material powder/ceramic filler ratio in each of said individual layers and varying the content of said preceramic polymer binder to control shrinkage of said top layer/ intermediate layers/substrate composite body.

36. The method of claim 33 wherein each of said individual layers is further characterized by an individual layer shrinkage and further includes a ceramic filler and further comprising a step of controlling shrinkage in said layers during step (8) of heating said top layer/intermediate layers/ substrate composite body by varying the substrate material powder/preceramic polymer binder ratio in each of said individual layers while keeping ceramic filler content constant to control shrinkage of said top layer/intermediate layers/substrate composite body.

37. The method of claim 33 wherein each of said individual layers is further characterized by an individual layer shrinkage and further includes a ceramic filler and further comprising a step of controlling shrinkage in said layers during step (8) of heating said top layer/intermediate layers/ substrate composite body by varying the top layer material powder/preceramic polymer binder ratio in each of said individual layers while keeping substrate material powder content constant to control shrinkage of said top layer/ intermediate layers/substrate composite body.

38. The method of claim 33 wherein each of said individual layers is further characterized by an individual layer shrinkage and further includes a ceramic filler and further comprising a step of controlling shrinkage in said layers during step (8) of heating said top layer/intermediate layers/ substrate composite body by varying the ceramic filler/ preceramic polymer binder ratio in each of said individual layers while keeping substrate material powder content constant to control shrinkage of said top layer/intermediate layers/substrate composite body.

39. The method of claim 33 wherein each of said individual layers is further characterized by an individual layer shrinkage and further includes a ceramic filler and further comprising a step of controlling shrinkage in said layers during step (8) of heating said top layer/intermediate layers/ substrate composite body by varying substrate material powder content, preceramic polymer binder content, top layer material powder content and ceramic filler content in each of said individual layers while gradually increasing preceramic polymer binder content from that present in the substrate to that present in the top layer.

40. The method of claim 1 wherein step (6) of applying said substrate material powder/preceramic polymer binder mixture further comprises steps of providing a die including a retractable piston, mounting said substrate on said retractable piston, applying a first substrate material powder/ preceramic polymer binder mixture characterized by a first substrate material/ceramic ratio on said substrate to form a first intermediate layer, retracting said piston, applying said top layer on said first intermediate layer and applying uniaxial pressure.

41. The method of claim 40 further including steps of applying a plurality of intermediate layers by repeatedly retracting said piston after formation of a preceding layer of a particular substrate material/ceramic ratio and applying a succeeding layer of a different substrate material/ceramic ratio on said preceding layer.

42. The method of claim 40 wherein said substrate is a metal substrate, said substrate material powder is a metal powder and said top layer is a ceramic.

43. The method of claim 1 wherein step (8) of heating is conducted to produce a strong, coherent, functionally gradient composite material.

44. The method of claim 1 wherein said step (8) of heating further comprises a first step of pyrolysis of said preceramic polymer binder at a pyrolysis temperature to produce a ceramic product followed by heating said ceramic product to a reaction temperature higher than said pyrolysis temperature to cause solid-state reaction of said ceramic product with said substrate material powder.

45. The method of claim 1 wherein said functionally gradient material is a copper/silicon carbide functionally gradient material, said substrate is copper powder, said substrate material powder is copper powder and said preceramic polymer binder is polycarbosilane.

46. The method of claim 1 wherein said functionally gradient material is a copper/silicon carbide functionally gradient material, said substrate is bulk copper, said substrate material powder is copper powder and said preceramic polymer binder is polycarbosilane.

47. The method of claim 1 wherein said functionally gradient material is an aluminum/silicon carbide functionally gradient material, said substrate is aluminum powder, said substrate material powder is aluminum powder combined with said preceramic polymer binder and said preceramic polymer binder is poly(methylsilane).

48. A method for preparation of a functionally gradient material comprising:

(1) providing a substrate;

(2) providing a top layer;

(3) providing a top layer material powder having the same composition as said top layer;

(4) providing a preceramic polymer binder which can be pyrolyzed to yield a ceramic;

(5) mixing said top layer material powder with said preceramic polymer binder to form a top layer material powder/preceramic polymer binder mixture characterized by a top layer material/ceramic ratio;

(6) forming an intermediate layer characterized by said top layer material/ceramic ratio by applying said top layer material powder/preceramic polymer binder mixture to said substrate;

(7) applying said top layer to said intermediate layer to form a top layer/intermediate layer/substrate composite body; and (8) heating said top layer/intermediate layer/ substrate composite body so that a functionally gradient material including an intermediate layer having said top layer material/ceramic ratio is produced.

49. The method of claim 48 wherein said substrate is a ceramic substrate and said top layer is a metal top layer.

50. The method of claim 49 wherein said metal top layer is a metal selected from the group consisting of Sc, Ti, V, Cr, Mn, Fe, Co, Ni, Cu, Zn, Y, Zr, Nb, Mo, Tc, Ru, Rh, Pd, Cd, La, Hf, Ta, W, Re, Os, Ir, Pt, Au, Hg and mixtures thereof.

51. The method of claim 49 wherein said metal top layer is a metal selected from the group consisting of Al, Pb, Sn, Sb and Bi and mixtures thereof.

52. The method of claim 48 wherein said metal top layer is a metal selected from the group consisting of Ce, Pr, Nd, Pm, Sm, Eu, Gd, Tb, Dy, Ho, Er, Tm, Yb, Lu, Th, and U and mixtures thereof.

53. The method of claim 48 wherein said substrate is a metal selected from the group consisting of Sc, Ti, V, Cr, Mn, Fe, Co, Ni, Cu, Zn, Y, Zr, Nb, Mo, Tc, Ru, Rh, Pd, Ag, Cd, La, Hf, Ta, W, Re, Os, Ir, Pt, Au, Hg and mixtures thereof.

54. The method of claim 48 wherein said substrate is a metal selected from the group consisting of Al, Pb, Sn, Sb and Bi and mixtures thereof.

55. The method of claim 48 wherein said top layer is a ceramic selected from the group consisting of silicon carbide, silicon nitride, silicon oxycarbide, silicon oxynitride, boron nitride, aluminum nitride, transition metal nitrides, transition metal carbides, f-orbital inner transition metal carbides, boron carbide, transition metal silicides, transition metal borides, metal oxides, metalloid oxides and diamond and mixtures thereof.

56. A method for preparation of a functionally gradient material comprising:

(1) providing a substrate;

(2) providing a top layer;

(3) providing a substrate material powder having the same composition as said substrate;

(4) providing a top layer material powder having the same composition as said top layer;

(5) providing a preceramic polymer binder which can be pyrolyzed to yield a ceramic;

(6) mixing said substrate material powder with said preceramic polymer binder and said top layer material powder to form a substrate material powder/preceramic polymer binder/top layer material powder mixture characterized by a substrate material/top layer material/ceramic composition;

(7) forming an intermediate layer characterized by said substrate material/top layer material/ceramic composition by applying said substrate material powder/preceramic polymer binder/top layer material powder mixture to said substrate;

(8) applying said top layer to said intermediate layer to form a top layer/intermediate layer/substrate composite body;

(9) heating said top layer/intermediate layer/substrate composite body so that a functionally gradient material including said intermediate layer is produced.

57. An article prepared according to the method of claim 1.

58. An article prepared according to the method of claim 48.

59. An article prepared according to the method of claim 56.

* * * * *

UNITED STATES PATENT AND TRADEMARK OFFICE
CERTIFICATE OF CORRECTION

PATENT NO. : 5,455,000
DATED : October 3, 1995
INVENTOR(S) : Dietmar Seyferth and Pawel Czubarow It is certified that error appears in the above-identified patent and that said Letters Patent is hereby corrected as shown below:

Column 4, line 61: after "as", change "Al" to --Al--.
Column 5, line 8: after "oxynitride", insert ",".
Column 9, line 21: after "Nicalon", change "198" to -- ™ --.
Column 9, line 67: after "and", change "firling" to --firing--.
Column 10, line 47: after "shows", change "Al" to --Al--.
Column 10, line 63: after "an", change "Al" to --Al--.
Column 11, line 30: insert -- Table 4 --.
Column 12, claim 10, line 40: after "of" change "Al" to --Al--.
Column 16, claim 50, line 32: after "Pd", insert --Ag--.
Column 16, claim 51, line 36: after "of", change "Al" to --Al--.
Column 16, claim 54, line 49: after "of", change "Al" to --Al--.

Signed and Sealed this

Twenty-seventh Day of February, 1996

BRUCE LEHMAN

Attest:

Attesting Officer

Commissioner of Patents and Trademarks